United States Patent
Morreale et al.

(10) Patent No.: US 7,343,394 B2
(45) Date of Patent: Mar. 11, 2008

(54) METHOD OF MANAGING E-MAIL MESSAGES

(75) Inventors: Gero Morreale, Rome (IT); Sandro Piccinini, Rome (IT); Claudio Morgia, Rome (IT)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 10/793,462

(22) Filed: Mar. 4, 2004

(65) Prior Publication Data
US 2004/0181586 A1   Sep. 16, 2004

(30) Foreign Application Priority Data
Mar. 10, 2003   (FR)   ................................ 03 368020

(51) Int. Cl.
G06F 15/16   (2006.01)
G06F 17/00   (2006.01)

(52) U.S. Cl. ........................................ 709/206; 707/10

(58) Field of Classification Search ................ 709/206; 455/456.1, 456
See application file for complete search history.

(56) References Cited

U.S. PATENT DOCUMENTS

2002/0078158 A1* 6/2002 Brown et al. ............... 709/206
2004/0198390 A1* 10/2004 Kaise ...................... 455/456.1

* cited by examiner

*Primary Examiner*—Tim Vo
*Assistant Examiner*—Fariborz Khoshnoodi
(74) *Attorney, Agent, or Firm*—Stephen R. Tkacs; Stephen J. Walder, Jr.; Jeffrey S. LaBaw

(57) ABSTRACT

In a data processing system (100) supporting an electronic mail messaging system, a method of managing e-mail messages comprising, under the control of a mail user agent of a message sender user (QRS): keeping a list (455,450) of messages sent by the message sender user; enabling the sender user selecting (500,505,510) a wrong message (513) from the list of sent messages; causing a correcting message (520) to be sent to at least one of the message recipient users (ABC,DEF,JKL) of the selected message, the correcting message including message qualifier (X-replace-mail) qualifying the correcting message as a message intended to correct the selected message. Under the control of a mail user agent of said at least one of the message recipient users, the correcting message is received; using the message qualifier included therein, the selected message is identified among the received messages (715,720,730), and a correcting action on the selected message is performed.

5 Claims, 5 Drawing Sheets

METHOD OF MANAGING E-MAIL MESSAGES

TECHNICAL FIELD

The present invention generally relates to the field of electronic data processing systems, and particularly to computer networks supporting electronic mail systems.

BACKGROUND ART

With the growth of computer networks, electronic mail (shortly referred to as e-mail) has become an extremely popular interpersonal communication media, for both private and professional purposes. In particular, thanks to the impressive diffusion of the Internet in the past few years, Internet e-mail nowadays provides a standard communication mechanism for millions of computer users.

By means of any one of the several e-mail client softwares, such as IBM Lotusnotes, Microsoft Outlook or Outlook Express, and Eudora, just to cite some, composing and sending an e-mail message is a rather simple task, that involves specifying the e-mail address or addresses of one or more intended recipients of the message in one or more recipient address fields (the conventional "To", "Cc" and "Bcc" fields) of a message composition window, editing if desired a message subject field, editing a message body and, possibly, attaching one or more files to the message. In particular, compiling the recipient address fields is made easier by address book utilities, which allow creating user-defined address books wherein the user can save e-mail addresses for subsequent retrieval. These utilities also allows the user creating mailing lists or groups of recipients, including two or more e-mail addresses of recipients which are normally jointly included by the user in the list of recipients: when the user desires to send an e-mail message to the recipients of a given mailing list, he/she does not need to individually select each recipient from the address book, being sufficient to select the respective mailing list.

It frequently happens that, after having composed and sent an e-mail message to one or more recipients, the message sender realizes that the message, as such, should not have been sent. For example, by reviewing a copy of the sent message stored in a repository of sent messages, the message sender may notice that the message body contained some errors or was incomplete, or that one or more of the intended attachments were missing, or that the message was sent to the wrong recipient or recipients.

Situations like these cannot be remedied and are, at best, highly disappointing for both the message sender and the message recipients, not to say potentially dangerous. From one hand, the message sender has to inform the recipients of the erroneous message that the message they received contained errors, and possibly provide the correct information; this may be done by sending an additional e-mail message, by phone, or personally. From the other hand, the recipients of the erroneous message, if not informed properly and timely of the errors contained therein, waste time reading the incorrect message; they may even be lead astray by the erroneous information contained in the incorrect message, and, possibly, they may undertake undesired actions.

It is observed that the problem of sending erroneous messages, albeit probably not exclusively inherent to e-mail systems, is however exacerbated by the quickness of the process of compiling and sending e-mail messages.

SUMMARY OF THE INVENTION

In view of the state of the art outlined above, it has been an object of the present invention to improve the efficiency and reliability of e-mail systems.

In particular, it has been an object of the present invention to remedy the problems inherent to the delivery to the recipients of e-mail messages that, after being sent, are recognized by the sender to be erroneous.

This and other objects have been attained by means of a method as set forth in the appended claim 1.

In brief, under the control of a Mail User Agent (MUA) of a message sender user, a list of messages sent by the sender user is kept. The sender user is enabled selecting a message from a list of sent messages, and a correcting message is caused to be sent to at least one of the message recipient users of the selected message. The correcting message includes a message qualifier qualifying the correcting message as a message intended to correct the selected message. For example, the correcting message may be a univocal message identifier, which is assigned by the mail user agent to each message that is sent.

Under the control of an MUA of said at least one of the message recipient users, the correcting message is received and, using the message qualifier, the selected message is identified among the received messages, and a correcting action is performed on the identified selected message.

BRIEF DESCRIPTION OF THE DRAWINGS

The features and advantages of the present invention will be made apparent by the following detailed description of an embodiment thereof, provided merely by way of non-limitative example, which will be made in conjunction with the attached drawing sheets, wherein.

DETAILED DESCRIPTION OF THE PREFERRED EMBODIMENT

Figure 1:
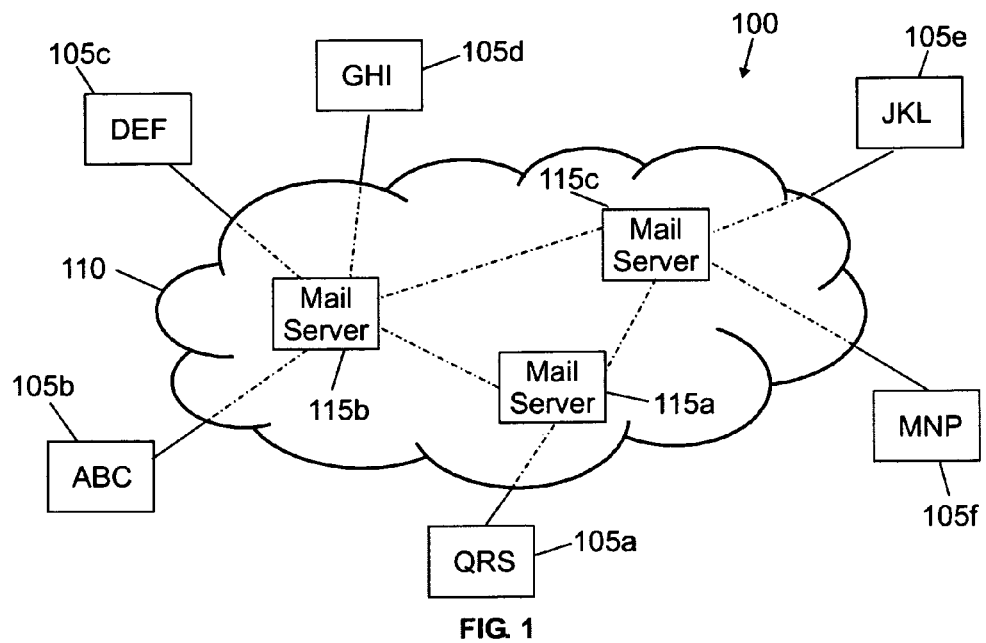
FIG. 1 is a schematic view of a computer network supporting an e-mail system.

With reference to the drawings, in FIG. 1 a distributed electronic data processing system or computer network 100 is schematically shown. The computer network 100 can be for example a local area network (LAN), a metropolitan area network (MAN), a wide area network (WAN) or a network of networks such as the Internet, particularly but not imitatively an open network, and comprises a plurality of computers 105a-105f interconnected to each other by means of a data communication infrastructure 110.

Figure 2:
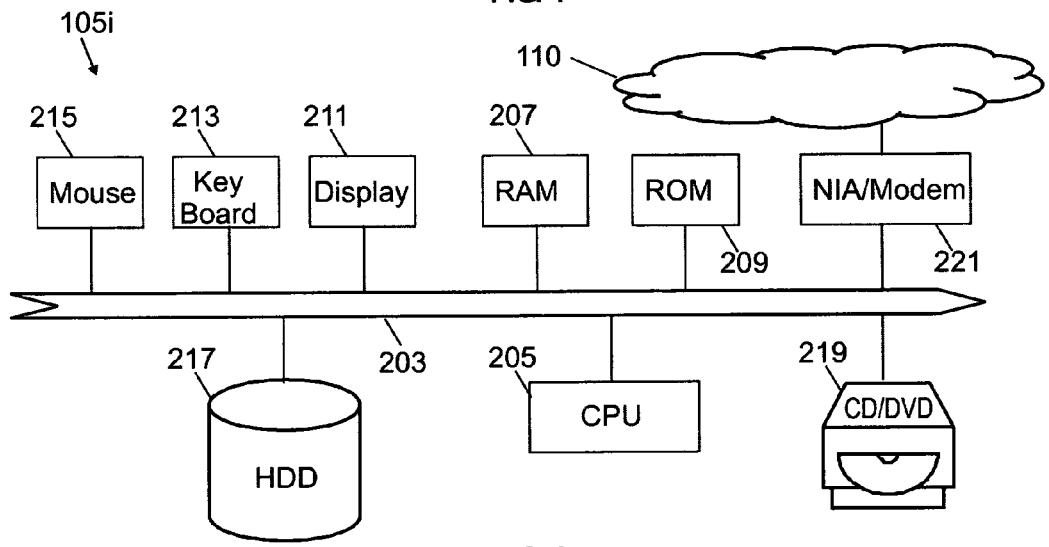
FIG. 2 schematically shows, in terms of functional blocks, the main components of a generic computer of the network.

As schematically shown in FIG. 2, a generic computer 105i of the computer network 100 comprises several functional units connected in parallel to a data communication bus 203, for example of the PCI type. In particular, a Central Processing Unit (CPU) 205, typically comprising a microprocessor, controls the operation of the computer 105i, a working memory 207, typically a RAM (Random Access Memory) is directly exploited by the CPU 205 for the execution of programs and for temporary storage of data, and a Read Only Memory (ROM) 209 is used for permanent storage of data, and stores for example a basic program for the bootstrap of the computer 105i. The computer 105i comprises several peripheral units, connected to the bus 203 by means of respective interfaces. Particularly, peripheral units that allow the interaction with a human user are provided, such as a display device 211 (for example a CRT, an LCD or a plasma monitor), a keyboard 213 and a pointing device 215 (for example a mouse). The computer 105i also includes peripheral units for local mass-storage of programs (operating system, application programs) and data, such as one or more magnetic Hard-Disk Drivers (HDD), globally indicated as 217, driving magnetic hard disks, and a CD-ROM/DVD driver 219, or a CD-ROM/DVD juke-box, for reading/writing CD-ROMs/DVDs. Other peripheral units may be present, such as a floppy-disk driver for reading/writing floppy disks, a memory card reader for reading/writing memory cards, printers and the like. The computer 105i is further equipped with a Network Interface Adapter (NIA) card 221 for the connection to the data communication network 110; alternatively, the computer 105i may be connected to the data communication network 110 by means of a MODEM.

Any computer 105b, . . . , 105f in the computer network 100 has a structure generally similar to that depicted in FIG. 2, possibly properly scaled depending on the machine computing power.

Referring back to FIG. 1, the computer network 100 supports an e-mail system, enabling users of the computers 105a-105f to exchange e-mail messages over the network 100. The details of the e-mail system are known per-se and will not be described in depth. Each one of the users of the computers 105a-105f who is a subscriber to the e-mail service is identified by a unique e-mail address; by way of non-limitative example, in the following it will be assumed that the e-mail system supported by the computer network 100 is an Internet e-mail system, in which an e-mail address takes the known form user@host.domain, and that users QRS, ABC, DEF, GHI, JKL, MNP of the computers 105a to 105f have respective e-mail addresses qrs@zx.org, abc@xy.com, def@xy.com, ghi@zw.com, jkl@zw.com, mnp@qr.net.

Figure 3:
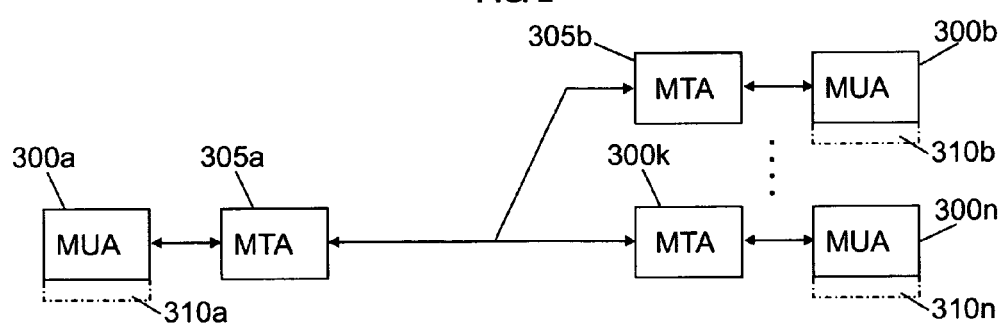
FIG. 3 schematically shows, in terms of functional blocks, the main components of the e-mail system.

As schematically depicted in FIG. 3, an e-mail system is conventionally composed by two kinds of sub-systems, cooperating with each other. A first type of sub-system includes Mail User Agents (MUAs) 300a-300n, which typically are client softwares running on the computers of the e-mail service subscriber users and enabling the users to handle e-mail messages. A second type of sub-systems includes Mail Transport Agents (MTAs) 305a-305k; an MTA acts as a bridge between two or more MUAs, handling the distribution, i.e. the delivery and the reception of e-mail messages. Typically, an MTA includes a Simple Message Transfer Protocol (SMTP) server, handling the reception and the delivery of e-mail messages from and to other SMTP servers, and/or a Post Office Protocol (POP) server, e.g. a POP3 server, handling the delivery of e-mail messages to the MUAs. An MTA may also include an Internet Message Access Protocol (IMAP) server, e.g. an IMAP4 server, allowing a user to handle e-mail messages on the mail server directly from his/her computer, through the respective MUA. Several MUAs are commercially available, such as IBM Lotusnotes, Microsoft Outlook and Outlook Express, and Eudora. In general, an MUA provides a user interface for composing, receiving and reading e-mail messages, is capable of formatting the messages with the correct syntax, and is capable of handling communications with the MTA by means of the SMTP, POP3 and IMAP protocols.

One or more computers 115a, 115b and 115c in the computer network 100 of FIG. 1 act as MTAs or mail servers; in particular, any mail server 115a, 115b, 115c may receive e-mail messages from a sender computer or from another mail server, and may deliver the received message to a recipient computer or to another mail server.

When a computer user desires to take advantage of the e-mail system, he/she has to preliminary subscribe for the service at a mail server; an e-mail account is opened at the mail server for the new subscriber, an e-mail address is assigned thereto, and a mailbox is created. Typically, e-mail messages addressed to a given e-mail address are stored in the mailbox of the mail server holding the corresponding account, until the subscriber user connects to the mail server and downloads the messages from the mailbox. Similarly, when a subscriber user desires to send an e-mail message to one or more other subscribers, he/she composes the e-mail message and sends the message to the respective mail server, which then delivers the message to the intended recipients, according to the e-mail addresses specified in the message, as will be described later on.

If, for example, the user QRS of the computer 105a (the sender) intends to send an e-mail message to one or more of the users ABC, DEF, GHI, JKL, MNP of the computers 105b-105f (the recipients), the computer 105a sends the message to the respective mail server 115a; based on the e-mail addresses of the message recipients, the mail server 115a then delivers the e-mail message to the proper mail servers 115b, 115c of the intended recipients. Each mail server 115b, 115c holds, for each of the respective subscriber users, a mailbox of incoming e-mail messages; by connecting to the mail server, each of the users ABC, . . . , MNP who is in the list of recipients can download the messages in the respective mailbox.

In order to interact with the respective mail server 115a-115c, in each of the computers 105a-105f an e-mail client software is installed. The e-mail client software, when running, acts as an MUA, allowing the user of the computer to compose and send an e-mail message and/or to connect to the respective mail server, so as to download and display the e-mail messages addressed to him/her.

Figure 4:
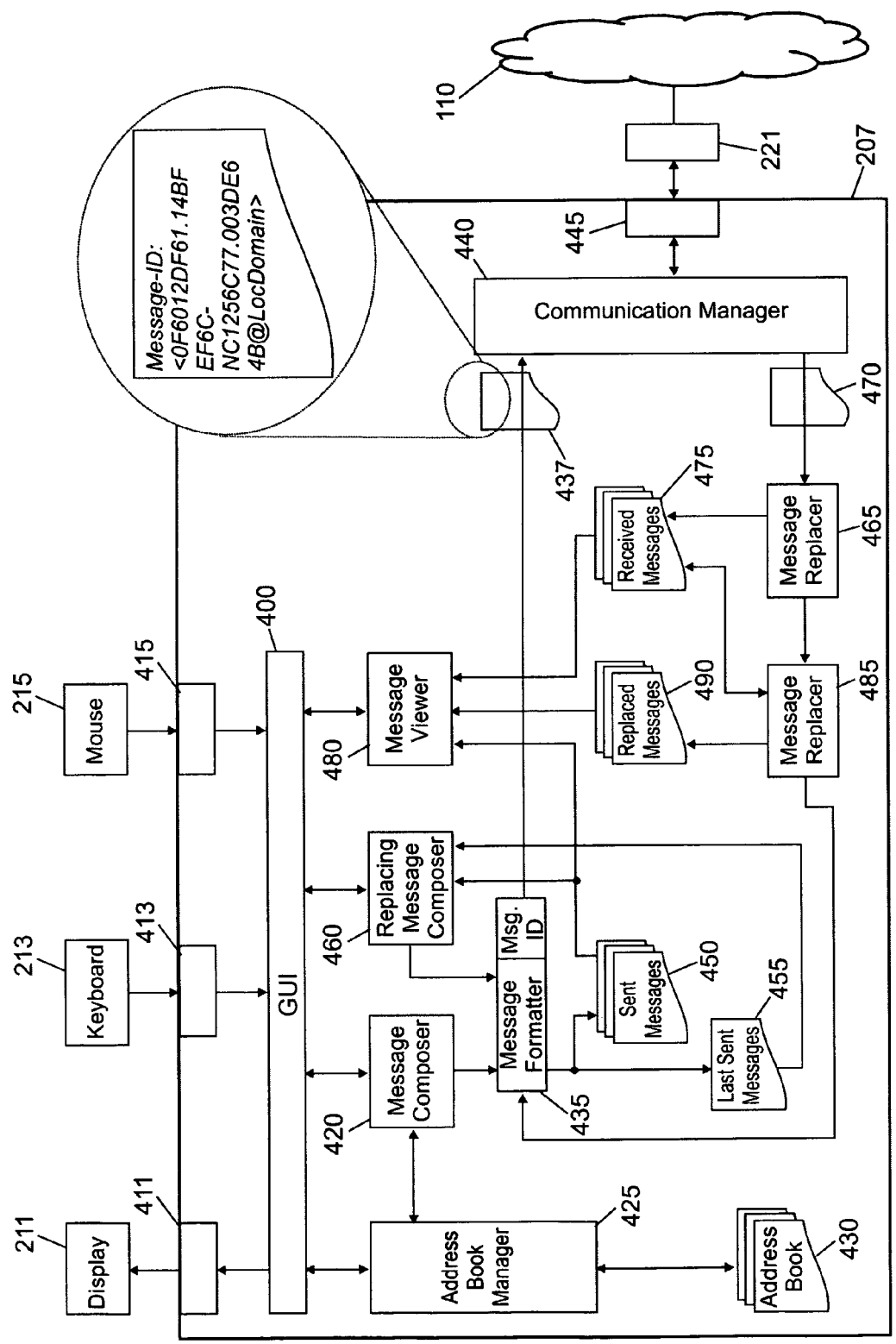
FIG. 4 pictorially shows a partial content of a working memory of a generic computer of the network while executing an e-mail client software according to an embodiment of the present invention.

FIG. 4 schematically shows a partial content of a working memory 207 of the generic computer 105i of the network 100, while executing an e-mail client software according to an embodiment of the present invention. A graphical user interface (GUI) 400 allows a friendly interaction of the computer user with the e-mail client software, through the display device 211 and the input devices 213 and 215; in particular, hardware-dependent software drivers 411, 413 and 415 are exploited by the GUI 400 for communicating with the peripheral devices 211, 213 and 215.

When the user wishes to compose a new e-mail message, a message composer module 420 is invoked. The message composer module 420 guides the user in the process of composing the e-mail message; this process conventionally involves specifying the e-mail addresses of the intended recipients, editing the message body, attaching files etc. During the composition of the e-mail message, the user may invoke an address book manager utility 425, managing an address book 430 wherein the user can store, for subsequent retrieval, e-mail addresses of desired recipients. In particular, the address book manager utility 420 allows the user creating personalized recipient groups or lists, each one containing a group of recipients that, according to the user needs, may have to be jointly included in the list of recipients of a message.

Once the new message has been composed, it is passed to a message formatter module 435; the message formatter module 435 formats the new message according to the syntax prescriptions of one of the known standards for formatting e-mail messages. Examples of these standards are the Request For Comments (RFC) 822 ("Standard for the Format of ARPA Internet Text Messages") and the RFC 1341 (Multifunction Internet Mail Extension, shortly MIME), both of which are incorporated herein by reference; in particular, the RFC 822 standard is aimed at specifying the format of text messages in ASCII code, while the MIME standard, which is substantially an extension of the RFC 822 standard, also specifies the format for multimedia messages including sound, images, video.

Considering, for the sake of simplicity, the RFC 822, this standard prescribes in particular that an e-mail message is a text string formed by a message header portion and a message body portion, separated by a blank line. The message body portion contains the message body. The message header portion has a rigid format, and consists of several fields, some of which must be present in every e-mail message. Typically, the message header portion includes a field ("From" field) specifying the e-mail address of the message sender. One or more fields are provided for specifying the intended recipient or recipients of the message; in particular, a field ("To" field) specifies the e-mail address, or the list of e-mail addresses of the intended primary recipients; an optional field ("Cc" or carbon-copy field) specifies the e-mail address, or the list of e-mail addresses of recipients who, albeit not being the intended primary recipients, are intended to receive a (carbon) copy of the message, in addition to the primary recipients; another optional field ("Bcc" or blind carbon-copy field) specifies one or more e-mail addresses of recipients that are intended to receive the message in copy, without however letting the respective address or addresses to be visible by the remaining message recipients. A field ("Subject" field) contains the message subject (if any) specified by the user. A field ("Date" field) contains an indication of the date (and time) the message has been sent.

According to an embodiment of the present invention, the message formatter module 435 is configured so as to generate and include, in the message header portion of any message being formatted, an additional message identifier field; the message identifier field is used to specify a unique message identifier code univocally identifying the message. For example, under the standard RFC 822 the optional header field "Message-ID" can be exploited. The uniqueness of the message identifier field shall be guaranteed by the e-mail client software running on the computer of the message sender; a message identifier code pertains to exactly one instantiation of a particular message.

By way of example, let it be supposed that the user QRS of the computer 105a prepares an e-mail message to be sent to the primary recipient ABC, and that a copy of the message has to be sent to the recipients DEF and JKL. The header of the formatted message will be:
Date: 31 Dec 03 2359 PDT
From: <qrs@zx.org>
Subject: Happy new year
To: <abc@xy.com>
Cc: <def@xy.com>, <jkl@zw.com>
Message-ID: <OF6012DF61.14BFEF6C-NC1256C77.003DE64B@LocDomain> where OF6012DF61.14BFEF6C-NC1256C77.003DE64B@LocDomain is the unique identifier code assigned to the message by the message formatter 435.

After the message formatter 435 has compiled the message, a compiled message file 437 is obtained. A communication manager 440 is invoked for handling the transmission of the message file 447 over the data communication infrastructure 110, by means of the network interface adapter/MODEM 221 (driven by a software driver 445). A copy of the compiled message file 437 is also stored in a repository folder 450 of sent messages, containing a copy of every message that have been sent.

According to an embodiment of the present invention, each time a new message is sent, a list 455 of the most recently sent e-mail messages is updated; in particular, the list 455 stores the content of the message identifier field ("Message-ID" field) and the subject field ("Subject" field) present in the header of the most recently sent e-mail messages; for example, the list 455 contains the five most recently sent messages.

The e-mail message is sent from the computer of the message sender to the respective mail server; for example, if the message sender is the user QRS, the message is sent from the computer 105a to the mail server 115a. On the basis of the list of recipients specified in the message header (field "To" and, optionally, fields "Cc" and "Bcc"), the mail server 115a delivers the message to the mailboxes of the intended recipients, if the accounts of the latter are held by the mail server 115a, or the mail server 115a routes the message to one or more other mail servers, e.g. the mail servers 115b and 115c.

When one of the intended message recipients, e.g. the user ABC having the e-mail address abc@xy.com, launches the respective e-mail client software on the respective computer 105b, the respective mail server 115b is accessed and the messages stored in the mailbox are downloaded from the mail server to the computer 105b. A message parser module 465 of the e-mail client software analyzes the format of the received message 470 and, once the message format has been analyzed and recognized as an admissible or supported format, the received message is stored in a repository folder 475 of received messages. The user ABC may be informed of the receipt of a new message by visual and/or acoustical signals. Through a message viewer module 480, the user ABC can access the repository folder 475, select the desired message, e.g. by reading the message subject and/or the e-mail address of the message sender, and display the full message. Normally, after a message has been displayed by the message viewer, the message is marked as "read"; by marking a message already displayed as "read", the message is displayed differently from a message that has not been read yet. Commercially-available e-mail client softwares also allow a user to delete a received message, removing it from the repository folder 475, create custom-defined repository folders, and so on.

Let it be assumed that the message sender, after having sent a given message, realizes that the message should not have been sent as such, for example because it contained errors in the message body, in the message subject, one or more attachments were missing, or undesired recipients were included in the recipient list. In the following, one such message will be simply referred to as a wrong message.

Figure 5:
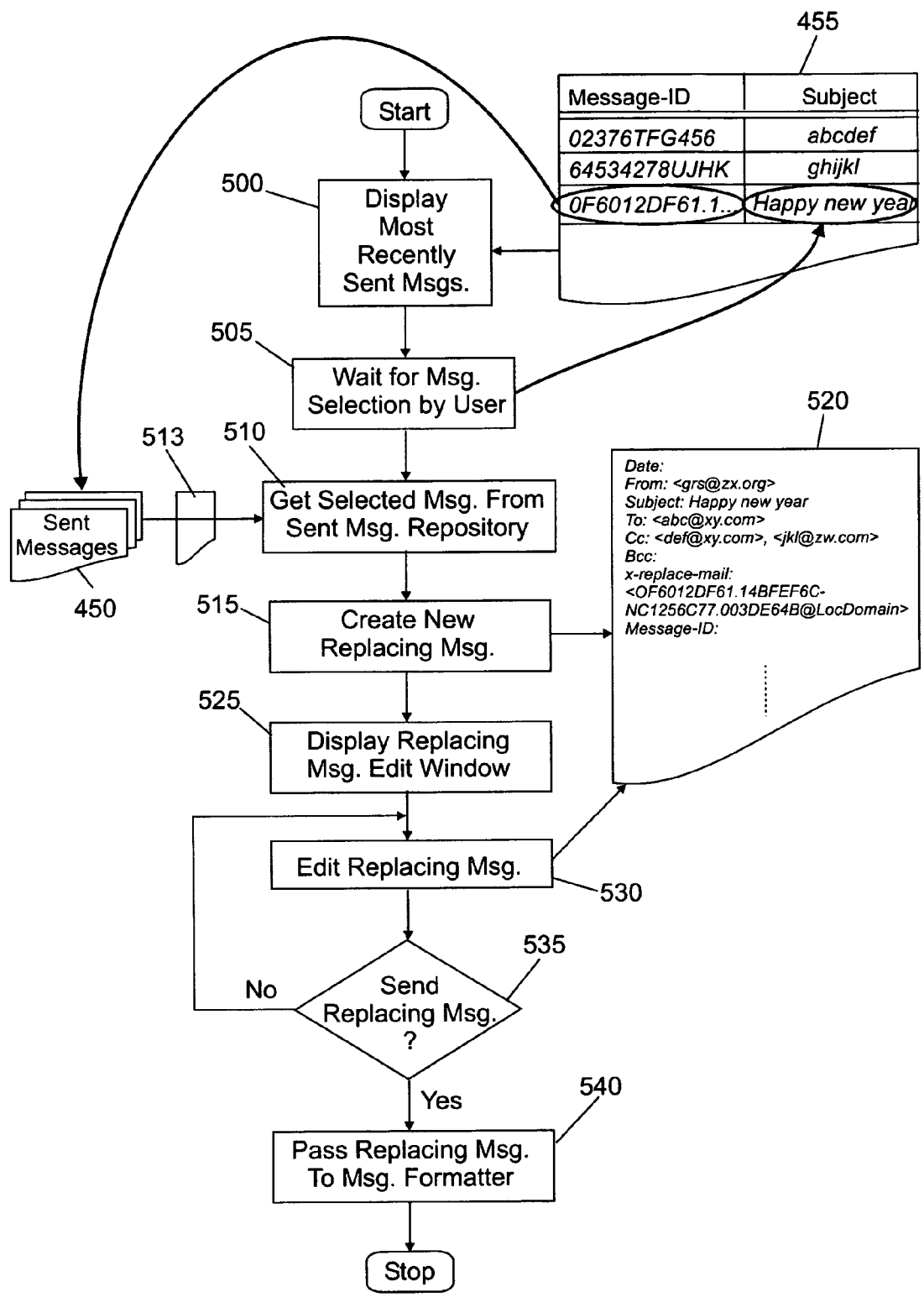
FIG. 5 is a schematic flowchart illustrating a process of generation of a correction e-mail message directed to correct an erroneous message, in an embodiment of the present invention.

According to an embodiment of the present invention, when the sender realizes that a wrong message has been sent, the user invokes a replacing message composer module 460. This module is for example invoked by clicking on a button, or selecting a menu item, in the displayed window of the e-mail client software. The operation of the replacing message composer module is schematically depicted in the flowchart of FIG. 5, and will be now described in detail.

Figure 6:
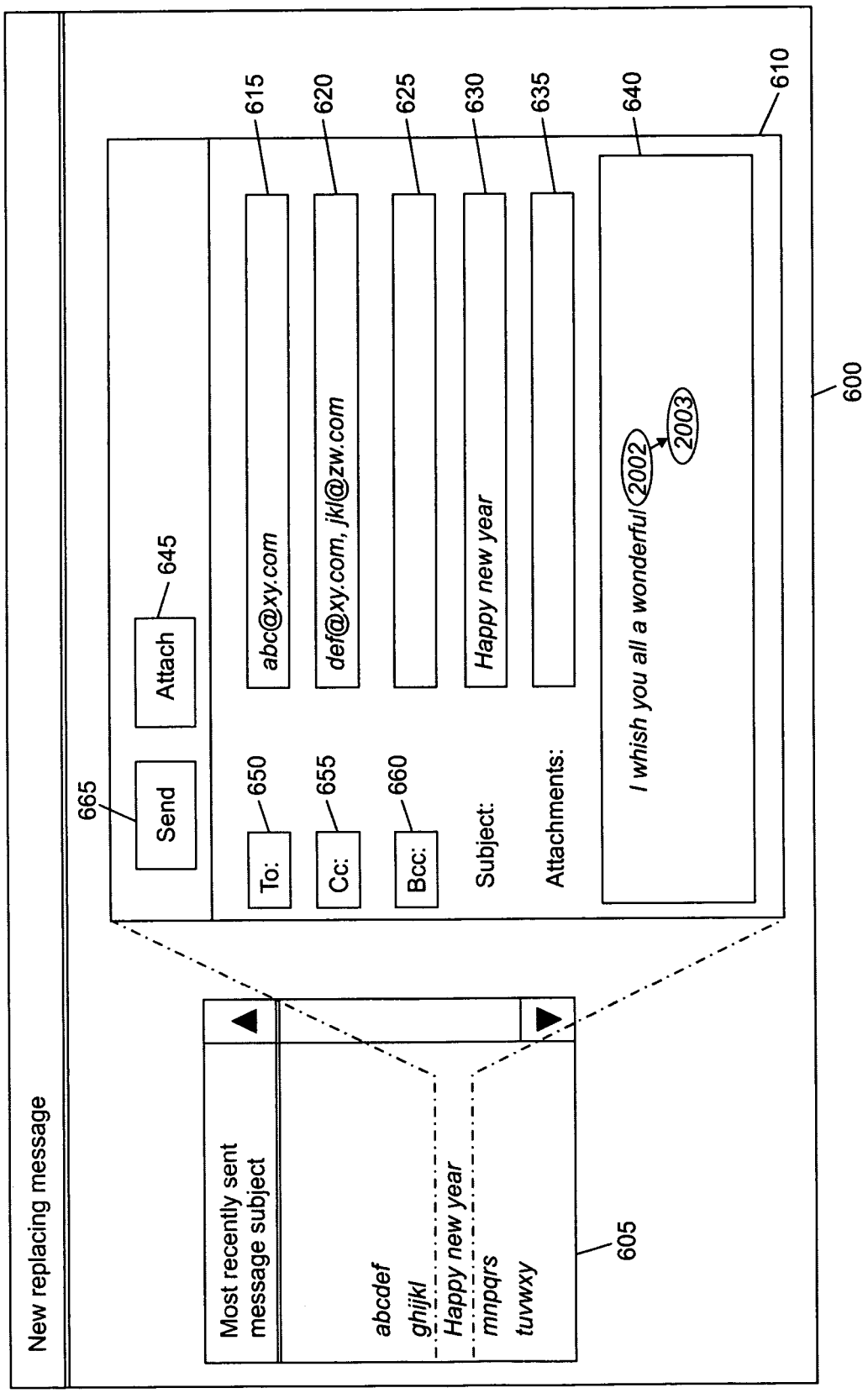
FIG. 6 pictorially shows a menu page that is displayed to a user of the e-mail client software for guiding him/her in a process of composition of the correction message.

When the replacing message composer module 460 is invoked and launched, a replacing message composition window is caused to be displayed by the GUI 400 on the display device 211 of the computer of the sender. FIG. 6 schematically shows an exemplary replacing message composition window 600. The list 455 of the most recently sent e-mail messages is accessed, and the content of the "Subject" field of the most recently sent e-mail messages, stored in the list 455, is displayed to the user in an area 605 of the window 600 (block 500). The replacing message composer module 460 then waits for the user to select the wrong message to be replaced (block 505); looking at the displayed subjects of the most recently sent messages, and using for example the pointing device 215 or the keyboard, the user selects the wrong message among the most recently sent messages by clicking onto the corresponding subject displayed in the window area 605.

It is observed that, in principle, the user might be allowed to select the wrong message through the whole list of sent messages, but enabling the replacement of relatively old messages normally has scarce effect, because the longer the time lapsed from when the wrong message was sent, the higher the probability that the wrong message has already been read by the recipients.

It is also observed that, in an alternative embodiment, the provision of the list 455 of most recently sent messages could be dispensed for, and the replacing message composer module 460 might access the sent messages repository 450 directly, rank the messages in sending date and time order, and select for the visualization in the window area 605 the, e.g., five most recently sent messages.

The user, reading the subjects of the most recently sent messages displayed in the window area 605, identifies the wrong message to be replaced and selects it; according to the shown example, it is supposed that the message having subject "Happy new year" is selected. When the user selects the wrong message to be replaced, the replacing message composer module 460 gets the associated message identifier code of the wrong message stored in the list 455; using the message identifier code as a search key, the replacing message composer module 460 searches the sent messages repository 450 and identifies therein the wrong message 513 (block 510).

Once the wrong message has been identified in the repository 450, the replacing message composer module 460 creates (block 515) a new replacing message, schematically shown as 520 in FIG. 5; the new replacing message 520 is pre-compiled by the replacing message composer module 460 with data got from the selected wrong message; in particular, the message header fields "From", "Subject", "To", "Cc", "Bcc", and the message body of the new message 520 are pre-compiled by the replacing message composer module 460 copying there into the information got from the corresponding fields of the selected wrong message 513.

The replacing message composer module 460 also includes in the new message 520 the unique message identifier code got from the "Message-ID" header field of the selected wrong message. According to an embodiment of the present invention, the wrong message identifier code is put in a specifically designed, additional header field, named for example "X-replace-mail". It is observed that, for example, the RFC 822 standard allows the addition, in the header portion of an e-mail message, of one or more user-defined fields. In particular, the RFC 822 standard prescribes that a user-defined field is any field which has not been defined in the RFC 822 specification itself or published as an extension of that specification. The names to be assigned to the user-defined fiels must be unique. User-defined header fields can also be created under the MIME standard, following similar rules, being the MIME standard an extension of the RFC 822 standard. More generally, the replacing message composer module 460 includes in the new message 520 a message qualifier, qualifying the message as a message intended to correct, e.g. by replacing, a wrong message, and an indication of the wrong message to be deleted or replaced by the replacing message; such an indication, i.e. its information content, its form, and the specific way of inclusion in the replacing message 520, may be whatsoever, and only needs to be comprehensible to the e-mail client software of the recipients, allowing the e-mail client software to identify the wrong message among the received messages.

Then, the replacing message composer module 460 causes, through the GUI 400, a message editing window to be displayed in an area 610 of the window 600 (block 525). The message editing window is substantially identical to the message composition window that is normally caused to be displayed by the message composer module 420 when the user wishes to compose a new e-mail message. In particular, the message editing window 610 includes: fill-in fields 615 to 625 for specifying the e-mail address or addresses of the primary intended message recipients ("To" header field), of the message carbon-copy recipients ("Cc" header field) and of the message copy recipients whose addresses are to be kept secret to other recipients ("Bcc" header field); a fill-in field 630 for specifying the message subject; a fill-in field 635, for specifying one or more attachments to the message; and a fill-in field 640, where the user can write the desired text body of the e-mail message. All these fields 615 to 640 are displayed to the user pre-compiled with the data taken from the wrong message 513 selected by the user; in this way the user can look at the details of the selected wrong message.

The user can edit the fill-in fields 615 to 640, using the input devices 213 and 215 (block 530). For example, the user can: modify the message subject (fill-in field 630) and/or the message body (fill-in field 640); modify the attachments to the message (fill-in field 635) (the user is normally guided in the selection of the files to be attached by a pop-up menu page—not shown—displayed by clicking on an "Attach" button 645 in the window 610); modify the list of message recipients by editing the fields 615, 620 and 625, for example to add or remove e-mail addresses, or to move one or more e-mail addresses from one field to another field; clicking on buttons 650, 655, 660, the user may invoke the address book manager utility 425 so as to access the address book 430. In this example, it is supposed that the user edits the message body so as to correct the error "2002" into "2003".

When the replacing message editing is completed, the user causes the replacing message to be sent by clicking on a "Send" button 665 (decision block 535, exit branch Y). In this way, the replacing message composer module 460 passes the replacing message 520 to the message formatter 435 (block 540), which causes the message to be formatted according to the prescribed standard, assigns a unique message identifier code to the message 520, puts the date and time in the "Date" header field of the message, and invokes the communication manager 440. The replacing message 520 is treated by the message formatter 435 and the communication manager 440 just like any other message 437; just like any other message, the replacing message 520 is sent from the computer of the message sender QRS to the respective mail server 115a. On the basis of the list of recipients specified in the message header, the mail server 115a delivers the message to the mailboxes of the intended recipients, if the accounts of the latter are held by the mail server 115a, or the mail server 115a routes the message to one or more other mail servers, e.g. the mail servers 115b and 115c.

According to an embodiment of the present invention, a message replacer module 485 is provided in the e-mail client software of a message recipient. The message replacer module 485 runs for example in background when the e-mail client software is running, and is operatively coupled to the message parser module 465.

Figure 7:
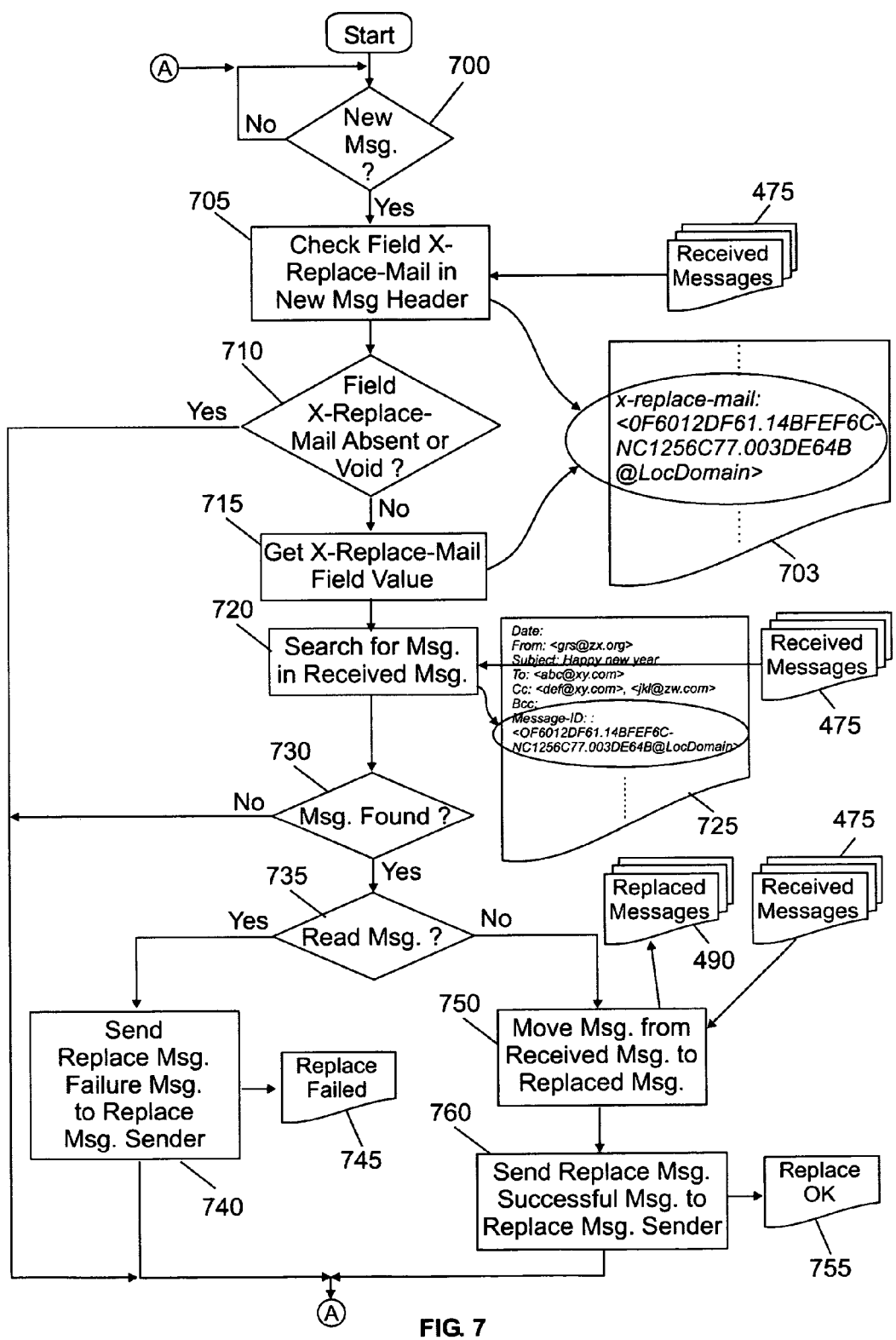
FIG. 7 is a schematic flowchart illustrating a process of automatic replacement of an erroneous message by means of the correction message, in an embodiment of the present invention.

The operation of the message replacer module is schematically depicted in the flowchart of FIG. 7.

The message replacer module 485 normally waits for a new message to be received (decision block 700, exit branch N). When the message replacer module 485 is signalled by the message parser module 465 that a new message has been received (decision block 700, exit branch Y), the message replacer module 485 accesses the last received message 703 in the received message repository folder 475, and checks whether the last received message includes, in the header portion, the user-defined header field "X-replace-message" (block 705), i.e. the message qualifier qualifying the message as a correction message of a wrong message; if no such field is found in the last received message 703, or if such a field exists but is void (decision block 710, exit branch Y), the message replacer module 485 does not undertake any further action, and jumps back to the new received message wait loop (connector A). If instead the field "X-replace-message" is found to be present and not void (decision block 710, exit branch N), the message replacer module 485 gets the value contained in the field "X-replace-message" of the last received message 703 (block 715) and uses this value as a search key for searching the repository folder 475, so as to find out a message having, in the "Message-ID" field, a value coincident with the value got from the field "X-replace-message" of the last received message 703 (block 720). If no such message is found (decision block 730, exit branch N), for example because the message has not been received, or because the message has been received, read and deleted by the user ABC, the message replacer module 485 does not undertake any action, and jumps back to the new received message wait loop. If instead a message 725 is found (decision block 730, exit branch Y), the message replacer module 485 checks whether the message 725 is marked as "read" (i.e., the message 725 has already been displayed by the recipient, e.g. the user ABC); according to an embodiment of the present invention, in the affirmative case (decision block 735, exit branch Y), the message replacer module 485 does not undertake any action on the already read wrong message, and the replacement message will be simply displayed as a new message; preferably, the message replacer module causes a default replacement failure message 745 to be sent back to the message sender QRS (block 740), so as to inform the sender that the replacement of the wrong message failed. If the message 725 is not marked as "read" (decision block 735, exit branch N), the message replacer module 485 deletes the wrong message or, preferably, moves the message 725 from the repository folder 475 into a different repository folder 490, intended to contain the replaced messages (block 750), and causes a default replacement successful message 755 to be sent back to the message sender QRS (block 760). In this way, the wrong message 725 is removed from the list of received messages, and the user ABC will not see the wrong message, unless he/she deliberately accesses, via the message viewer 480, the repository 490. The message replacer module 485 then jumps back to the beginning, waiting for a new message to be received.

Preferably, the message viewer 480, recognizing from the presence of the header field X-replace-mail that the message is a replacement message of a wrong message, displays the message in a form such as to make clear to the message reader the replacement nature of the message. The user is however left free to display the wrong message through the message viewer 480.

Thanks to the present invention, the problems inherent to the delivery of wrong e-mail messages are at least mitigated; a message sender is in fact enabled to try and automatically replace a wrong message already sent with a correct message.

The message sender can choose to send the correct message to some of the recipients of the wrong message only, in this way allowing to remedy situation in which the sender inadvertently sends a message to some undesired recipients.

It is observed that, in an embodiment of the present invention, the wrong messages, once identified, are not canceled from the computer of the recipients, but are simply moved into a special folder; in this way, piracy actions are prevented.

As schematically depicted in FIG. 3, the present invention can be implemented in a rather easy way by designing a plug-in 310a, 310b, . . . , 310n for the existing, commercially available MUAs. No changes to the MTAs are required. It is pointed out that the implementation of the present invention does not pose problems of compatibility between MUAs equipped with the plug-in and MUAs not equipped with the plug-in: the latter will simply treat a replacement message as any other message, without undertaking any action on the wrong message specified in the replacement message.

Although the present invention has been described by way of an embodiment, it is apparent to those skilled in the art that several modifications to the described embodiments, as well as other embodiments of the present invention are possible without departing from the scope thereof as defined in the appended claims. For example, different ways of identifying a selected wrong message can be envisaged. way allowing to remedy situation in which the sender inadvertently sends a message to some undesired recipients.

It is observed that, in an embodiment of the present invention, the wrong messages, once identified, are not canceled from the computer of the recipients, but are simply moved into a special folder; in this way, piracy actions are prevented.

As schematically depicted in FIG. 3, the present invention can be implemented in a rather easy way by designing a plug-in 310a, 310b, . . . , 310n for the existing, commercially available MUAS. No changes to the MTAs are required. It is pointed out that the implementation of the present invention does not pose problems of compatibility between MUAs equipped with the plug-in and MUAs not equipped with the plug-in: the latter will simply treat a replacement message as any other message, without undertaking any action on the wrong message specified in the replacement message.

Although the present invention has been described by way of an embodiment, it is apparent to those skilled in the art that several modifications to the described embodiments, as well as other embodiments of the present invention are possible without departing from the scope thereof as defined in the appended claims. For example, different ways of identifying a selected wrong message can be envisaged.

The invention claimed is:

1. In a data processing system supporting an electronic mail messaging system, a method of managing e-mail messages, comprising:

under the control of a mail user agent of a message sender user:

keeping a list of messages sent by the message sender user;

enabling the sender user selecting a message from the list of sent messages, the selected message including a list of message recipient users containing at least one message recipient user, wherein the selected message was previously sent to the at least one message recipient user;

causing a correcting message to be sent to at least one of the message recipient users in the list of message recipient users of the selected message, the correcting message including a message qualifier qualifying the correcting message as a message intended to correct the selected message;

under the control of a mail user agent of said at least one of the message recipient users:

receiving the correcting message;

using the message qualifier included in the received correcting message, identifying the selected message among the messages received by the mail user agent of the at least one message recipient user;

performing a correcting action on the identified selected message, in which said performing a correcting action on the identified selected message includes:

ascertaining whether the identified selected message has already been read by the at least one of the message recipient users, and replacing the identified selected message with the received correcting message on condition that the identified selected message has not yet been read; and sending a correcting action confirmation message back to the message sender user.

2. The method of claim 1, further comprising:

under the control of the mail user agent of the message sender user:

assigning to each sent message a univocal message identifier; and including the message identifier of the selected message in the correcting message, and under the control of the mail user agent of said at least one message recipient user:

using the message identifier of the selected message included in the correcting message for identifying the selected message among the received messages.

3. The method of claim 1, in which said performing a correcting action on the identified selected message includes:

replacing the identified selected message with the received correcting message.

4. The method of claim 1, in which said replacing the identified selected message includes:

providing a repository of received messages, in which received messages are stored;

providing a repository of replaced messages, the replaced message repository being distinct from the repository of received messages, and Moving the identified selected message from the repository of received messages into the repository of replaced messages.

5. The method of claim 1, in which said sending a correcting action confirmation message back to the message sender user includes notifying the message sender user of a successful outcome of the correcting action in case the identified selected message is replaced by the correcting message, otherwise notifying the message sender user of an unsuccessful outcome of the correcting action.

* * * * *